United States Patent
Lilley et al.

[15] 3,678,257
[45] July 18, 1972

[54] METHOD AND APPARATUS FOR DETERMINING THE VOLUMETRIC AVERAGE OF A PARAMETER

[72] Inventors: G. C. Lilley, Houston; Robert Herrick Kolb, Cypress, both of Tex.

[73] Assignee: Shell Oil Company, New York, N.Y.

[22] Filed: June 17, 1970

[21] Appl. No.: 47,060

[52] U.S. Cl. .................235/151.34, 73/194 M, 235/92 FI, 73/194
[51] Int. Cl. .........................................G01f 1/00, G06f 7/38
[58] Field of Search.................235/151.34, 92 FI; 73/194 E, 73/194 M, 231 M, 233

[56] References Cited

UNITED STATES PATENTS

| | | | |
|---|---|---|---|
| 3,566,685 | 3/1971 | Zimmerman | 235/151.34 X |
| 3,176,514 | 4/1965 | Foster | 73/233 X |
| 3,488,996 | 1/1970 | Pfrehm | 73/61.1 |
| 3,425,274 | 2/1969 | Clement | 73/229 X |
| 3,315,524 | 4/1967 | Duffy | 73/194 M X |
| 3,385,108 | 5/1968 | Rosso | 235/151.34 X |

Primary Examiner—Malcolm A. Morrison
Assistant Examiner—Edward J. Wise
Attorney—Harold L. Denkler and Theodore E. Bieber

[57] ABSTRACT

The volumetric average of a parameter is determined by measuring volumetric increments of fluid passing through a conduit and producing a signal indicative of the value of the parameter only upon completion of a volume increment. The signal is summed. The summed signal is proportional to volume times the parameter. The summed signal is divided by the number of volume increments to provide the volumetric average of the parameter.

9 Claims, 6 Drawing Figures

INVENTOR
G. C. LILLEY
ROBERT HERRICK KOLB
BY:

Harold L. Denkler
ATTORNEY

METHOD AND APPARATUS FOR DETERMINING THE VOLUMETRIC AVERAGE OF A PARAMETER

BACKGROUND OF THE INVENTION

This invention is disclosed in conjunction with a fluid carrying conduit to determine the volumetric average of a parameter of the fluid flowing therethrough. It should be apparent that this invention is useful in the measuring of a liquid, a gas, gas mixtures, gas-liquid mixtures and mixtures of different liquids and slurries of solid particles suspended in gas or liquid. Flow parameters such as temperature, pressure, gravity, liquid/liquid ratio, gas/liquid ratio and others can be volumetrically averaged by this invention.

The purchase and sale of valuable liquids transported through a conduit is typically carried out by measuring the volume of the liquid passing through the conduit at a given point at whatever pressure, temperature, liquid purity, liquid gravity and the like occur at the measuring site. Volumetric change due to pressure variation is of minor importance when measuring liquids as contrasted to gas measurement. In liquid measurement, a volumetric change because of temperature differential is substantially more important.

The standard unit of measurement for crude oil and liquid petroleum products is a barrel measured at 14.7 PSIA and 60° F. Measurement at the exact standard temperature and pressure is unusual thereby requiring the metered volume to be corrected to the equivalent volume at standard conditions. A temperature difference of 20° F from standard causes a volume change of about 1 percent and temperature correction must consequently be accurately done.

Where the flow rate and temperature are relatively steady throughout a metering period, a simple line temperature recorder will provide the temperature data necessary to calculate the correction to be applied to the metered volume. When line temperature varies appreciably during a metering period, it is difficult to determine a correct average temperature over the period of the record. When flow rate and line temperature both vary, accurate correction from recorded temperature data becomes impossible.

To solve this problem, meters have been equipped with mechanical temperature compensators which either continuously vary the transmission ratio between the meter shaft and the register shaft according to the prevailing line temperature or intermittently advance or retard the register shaft relative to the meter shaft by an amount proportional to the required correction. The continuous correction type compensator provides a continuous rotation of the register shaft but involves a frictional drive which is unreliable, requires considerable maintenance and is a frequent source of error. The intermittent type of compensator provides a more positive drive but interferes with normal meter proving operations by requiring the proven volume to be an exact multiple of the volume required to produce one intermittent correction cycle.

More sophisticated compensating techniques which overcome these disadvantages to a substantial extent have been proposed. The approach of these techniques has been to use a turbine meter of the type producing a substantial number of pulses for each revolution of the turbine rotor in conjunction with a pulse totalizer. An electronic switch is placed in the path between the turbine and the totalizer and is controlled by sensings of the various flow parameters. Typically, the pulse totalizer receives only a portion of the pulses produced by the meter and records the volume in standard units. Typical of this approach are the disclosures in U.S. Pat. Nos. 3,176,514; 3,385,108 and British Pat. No. 1,131,850.

The immediate compensation of sensed volume into standard volume as disclosed in these patents has several disadvantages. A malfunction in the electronic network gives either an inaccurate reading or no reading at all. Furthermore, the design of the compensating networks of the prior art necessarily makes certain assumptions about the metered fluid. For example, the compressibility or thermal expansion of the metered fluid is assumed to be a certain value when in reality this value varies with fluid composition. A crude pipeline may transport hydrocarbon liquids varying between about 10° and about 100° API. Since thermal expansion is a function of gravity, any assumed value for thermal expansion must be changed whenever the gravity changes or be incorrect during a portion of the metering period. The same inaccuracy occurs in measuring refined hydrocarbon products since liquids of various composition are typically sequentially transported through a pipeline. If the volumetric average temperature is known and the volumetric average gravity can be determined from a meter-paced sampler sample, then the correct expansion factor can be used to calculate an accurate temperature correction.

SUMMARY OF THE INVENTION

It is an object of the invention to provide a method and apparatus for determining the volumetric average of a parameter used to calculate the standard volume of a fluid passing through a conduit.

Another object of the invention is to determine the volumetric average of a sensed parameter of a fluid passing through a conduit by triggering a signalling device upon the passage of a predetermined volume through a metering station whereby the signalling device emits a signal indicative of the value of the sensed parameter and summing the signal.

This invention comprises a method and apparatus for determining the volumetric average of a parameter of a fluid passing through a conduit comprising a meter including means producing a first signal upon passage of a predetermined volume through the meter, a sensor operatively arranged to the conduit for sensing the value of the parameter, means for producing a second signal having a characteristic indicative of the value of the sensed parameter upon occurrence of the signal from the meter and means for summing the second signal. It is also necessary to sum the occurrence of the first signal to obtain a number proportional to volume to divide into the sum of the second signal to obtain the volumetric average.

DESCRIPTION OF THE PREFERRED EMBODIMENTS

Figure 1:
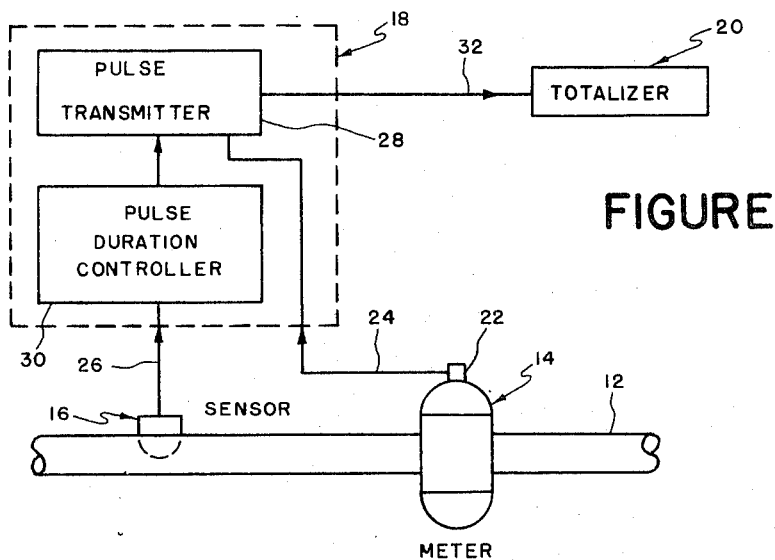
FIG. 1 is a schematic view of one embodiment of the invention.
Figure 2:
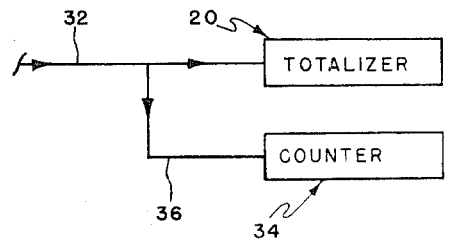
FIG. 2 is a partial block diagram of the invention showing another feature thereof.
Figure 3:
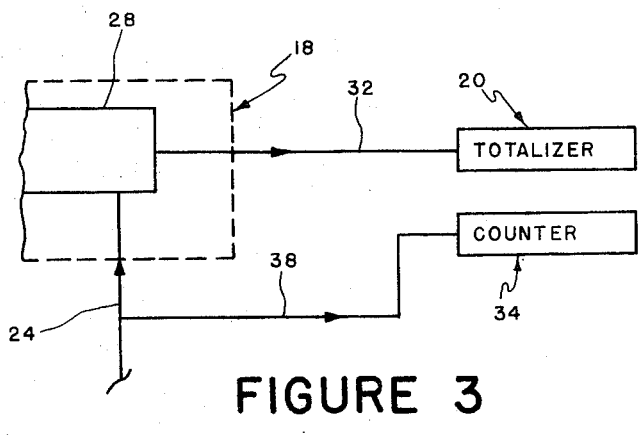
FIG. 3 is another partial block diagram of the invention showing a modification of the feature illustrated in FIG. 2.

Referring to FIG. 1, there is shown an apparatus or system for determining the volumetric average of a sensed parameter having as major components a conduit 12, measuring means 14 for sensing the quantity of fluid passing through the conduit 12, a sensor 16 for sensing the value of a desired parameter, signal producing means 18 operatively connected to the measuring means 14 and the sensor 16 and means 20 for summing the signals emitted by the signal producing means 18. The signal producing means 18 emits a signal having a characteristic indicative of the value of the sensed parameter. The signal producing means 18 emits this signal upon occurrence of a signal produced by the measuring means 14. The summing means 20 records a value proportional to the product of the sensed parameter and the volume sensed during the metering period. The recorded value from the summing means 20 may be converted into a number indicative of the volumetric average of the sensed parameter by dividing the recorded value by the number of transmissions from the signal producing means 18. The number of transmissions can be recorded, for example, by a counter means operatively connected to the first or second signals as shown in FIGS. 2 and 3.

The measuring means 14 may be any suitable type of volumetric meter such as a positive displacement meter or a turbine meter. The measuring means 14 includes a signal producing means 22 for emitting a first signal upon passage of a predetermined volume through the measuring means 14. The first signal may be a switch closure, an electrical pulse or other suitable signal capable of triggering the signal producing means 18. The measuring means 14 includes suitable registers for recording the actual volume metered. In practice, meter output pulses may occur to frequently and it may be desired to introduce a predetermining counter between 22 and 28 to scale them down. Such means can be included as part of 22.

The predetermined volume passing through the measuring means 14 to activate the signal producing means 22 is preferably a multiple of a unit of volume, e.g. one hundred barrels. It will be apparent that partial units of volume or non-multiples thereof can be used since the total from the summing means 20 is ultimately divided by the number of times the signal producing means 18 transmits. In most practical situations, the predetermined volume should be in excess of one unit of volume.

The number of multiple units of volume metered between signals from the signal producing means 22 is selected to provide a suitable temperature sampling rate at the prevailing flow rate. For example, if the signal producing means 18 is a pulse transmitter having a maximum pulse duration of fifteen seconds and the prevailing flow rate is ten barrels per minute which varies between five and twenty barrels per minute, the predetermined volume cannot be selected as one barrel since the signal producing means 18 cannot transmit this frequently. Under similar circumstances, the predetermined volume should not be selected as 100,000 barrels since the signal producing means 18 would transmit only once a week which does not provide sufficient data for accurate compensation. Under these circumstances, a practical range of the predetermined volume is ten to one hundred barrels although it is apparent that there is wide latitude in the selection of the volume to activate the signal producing means 22.

The sensor 16 is illustrated as a temperature sensing device although other parameters can be volumetrically averaged in accordance with this invention as previously explained. The sensor 16 is connected through a connection 26 such as a wire to the signal producing means 18.

The signal producing means 18 may be of a number of different types and preferably comprises a pulse transmitter 28 and a pulse duration controller 30. The controller 30 is connected to the sensor 16 and, in response to the temperature sensing therefrom, controls the length of time during which the pulse transmitter 28 emits a signal. Passage of the signal from the pulse transmitter 28 to the summing means 20 is controlled by a signal received from the second signal producing means 22 through a connection 24. The transmitter 28 is suitably connected to the summing means 20, as by a wire 32.

The signal producing means 18 may be any one of several commercially available devices such as the Metameter transmitter made by the Bristol Division of American Chain and Cable Company. As commercially available, this device provides, at regular intervals, a switch closure or electrical signal output having a duration proportional to the value of the temperature sensed. For use with this invention, the Metameter transmitter is equipped to generate only a single pulse or single switch closure each time a signal is received from the signal producing means 22. This may be accomplished in any suitable manner, as by placing a relay, operable by the signal producing means 22, in the connection 32 to couple the transmitter 28 to the summing means 20. In the alternative, the motor provided by the Metameter transmitter can be turned on for one revolution by the signal from the signal producing means 22.

Solid state electronic devices are commercially available which are analogous to the Metameter transmitter. It will be apparent to those skilled in the art that these solid state devices are useable with this invention.

The summing means 20 may comprise any suitable type of totalizer compatible with the signal producing means 18. With a variable duration pulse transmitter, the summing means 20 may comprise an elapsed time indicator which is turned on and off by the variable duration pulse from the transmitter 28. With a Metameter transmitter, the summing means 20 is preferably such an integrator made by the Bristol Division of American Chain and Cable Company.

For purposes of illustration it is assumed that the pulse transmitter 28 is of the Metameter type generating a pulse varying linearly from 3.0 seconds at 30° F to 12.0 seconds at 120° F. The predetermined volume necessary to produce the signal from the signal producing means 22 is assumed to be ten barrels. The following table illustrates an aggravated situation where temperature and flow rate fluctuate widely creating a large disparity between the time average temperature and the volumetric average.

TABLE

| temp F | volume barrels | time minutes | no. of pulses | duration of pulse in sec. | totalizer in seconds |
|---|---|---|---|---|---|
| 80° | 50 | 10 | 5 | 8.0 | 40 |
| 80° | 50 | 10 | 5 | 8.0 | 40 |
| 80° | 50 | 10 | 5 | 8.0 | 40 |
| 120° | 200 | 10 | 20 | 12.0 | 240 |
|  | 350 | 40 | 35 |  | 360 | time average temp × 3(80×10) + (120×10)/40 = 90°F volumetric average temp = 40+40+40+240/35 = 10.29 seconds/pulse = 102.9°F The reading from the summing means 20 must be divided by the number of pulses emitted from the transmitter 28. This divisor may be obtained by recording the volume sensed by the meter 14 during the measuring period and dividing that value by the predetermined volume necessary to trigger the signal producing means 22.

Another feature of this invention is shown in FIG. 2 wherein there is shown a counter 34 connected by a wire 36 to the connection 32. The counter 34 senses and records the number of pulses passing through the wire 32. The counter 34 accordingly indicates the number of pulse transmissions received by the summing means 20. Dividing the value from the summing means 20 by the value from the counter 34 provides a number indicative of the volumetric average temperature.

The counter 34 may be arranged in any suitable manner as may be deduced from FIG. 3. In FIG. 3, the counter 34 is illustrated as connected to the wire 24 by another wire 38. The counter 34 senses and records the number of signals passing through the wire 34 from the signal producing means 22. Since the transmitter 28 is turned on by signals through the wire 24, it will be apparent that the embodiment of FIG. 3 operates in substantially the same manner as the embodiment of FIG. 2.

Figure 4:
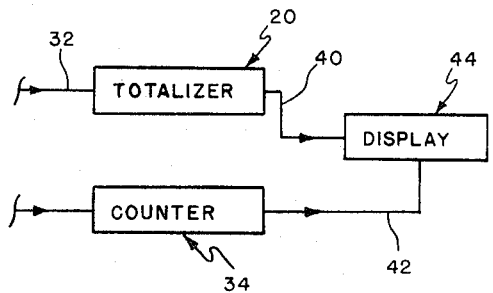
FIG. 4 is a partial block diagram of the invention showing another feature thereof.

Referring now to FIG. 4, there is illustrated another feature of the invention wherein the summing means 20 and the counter 34 are connected through wires 40, 42 to a display 44. The display 44 is provided with suitable internal circuitry to divide the value from the summing means 20 by the value from the counter 34. The display 44 may also be provided with suitable means to transpose the dividend into units of temperature.

A meter-paced sampling mechanism may be provided with the system to obtain a composite sample of the liquid metered during the metering period. From such a sample, the volumetric average thermal expansion coefficient can be obtained. The actual volume metered and recorded by the measuring means 14 may be converted to standard volume as is well known in the art.

Figure 5:
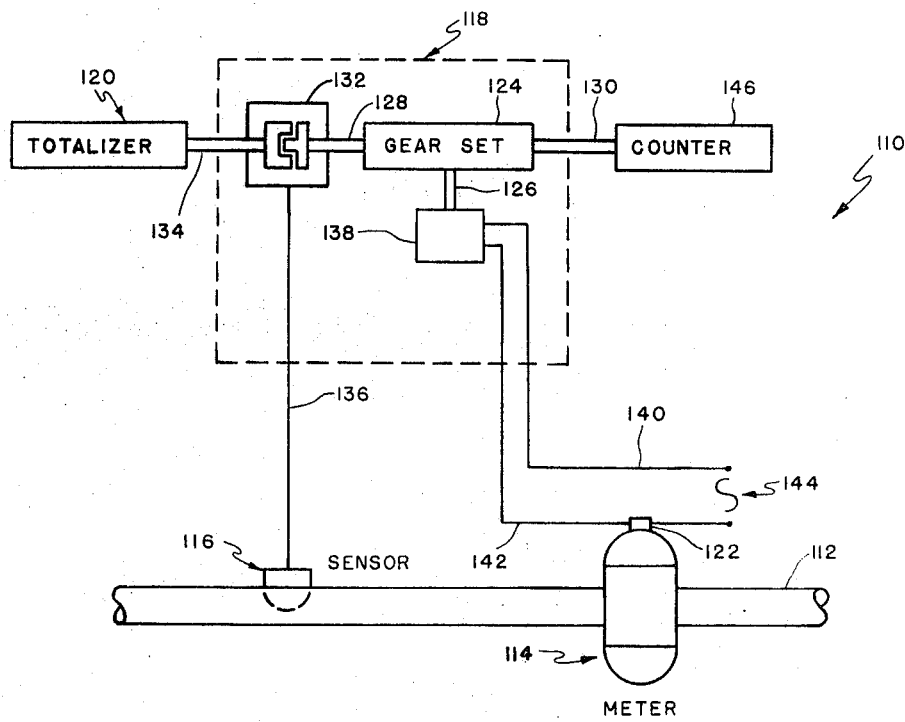
FIG. 5 is a schematic view of another embodiment of the invention.

Referring now to FIG. 5, there is shown another apparatus or system made in accordance with the principles of this invention. The apparatus comprises as major components a conduit 112, measuring means 114 for sensing and recording the quantity of fluid passing through the conduit 112, a sensor 116 for sensing the value of a desired parameter, signal producing means 118 operatively connected to the measuring means 114 and the sensor 116 means 120 for summing the signals emitted by the signal producing means 118. The signal produced by the means 118 is shaft rotation and the amount thereof is indicative of the value of the summed product of volume and the sensed parameter. The signal producing means 118 provides a shaft rotation upon occurrence of a signal produced by the measuring means 114. The summing means 120 totals the amount of shaft rotation during the metering period. The recorded value from the summing means 120 may be converted into a number indicative of the volumetric average of the sensed parameter by dividing the recorded value by the number of times the signal producing means 118 initiates shaft rotation.

The measuring means 114 may be of any suitable type as previously mentioned and includes a signal producing means 122 for emitting a first signal upon passage of a predetermined volume through the measuring means 114. The first signal may be a switch closure, an electrical pulse or any other suitable signal capable of triggering the signal producing means 118.

The signal producing means 118 may be constructed from commercially available elements such as an American Base Pressure Index manufactured by the American Meter Company and an electric motor. The index is conventionally used for automatic direct pressure compensation of gas meters. The index comprises as major components a gear set 124 having an input shaft 126 and a pair of output shafts 128 and 130 and a clutch assembly 132. One face of the clutch assembly is connected to the output shaft 128 while the other face thereof is connected through a shaft 134 to the summing means 120. The clutch assembly 132 of the conventional index is usually connected to a pressure sensor.

For use with this invention, the clutch assembly 132 is connected through a suitable connection 136 to the sensor 116 for engaging the clutch assembly 132 for a portion of each revolution of shaft 128 proportional to the value of the sensed parameter. There is added to the conventional index a motor 138 operatively connected to the input shaft 126. The motor 138 includes circuitry to provide one revolution for each time the motor 138 is turned on by the signal producing means 122. In the embodiment of FIG. 5, the signal producing means 122 may provide a switch closure to complete an electrical connection between the motor 138, a pair of power carrying wires 140, 142 and a suitable source of power 144.

The remaining output shaft 130 of the gear set 124 may be connected to a suitable revolution counter 146. The drive ratio between the input shaft 126 and the output shaft 130 is preferably 1:1 so that the counter 146 records the number of times the motor 138 is energized.

It will be apparent that the operation of the system in FIG. 5 is similar to that of the system in FIG. 1. The value recorded by the summing means 120 is proportional to the summed product of volume and temperature. By dividing this value by the reading from the counter 146, there is obtained a value indicative of the volumetric average of the parameter sensed by the sensor 116.

The apparatus described above in FIG. 5 may be used with a meter such as a turbine meter whose output is in the form of electrical pulses which are scaled down by an electronic totalizer which puts out a single electric pulse for a selected measured volume.

Figure 6:
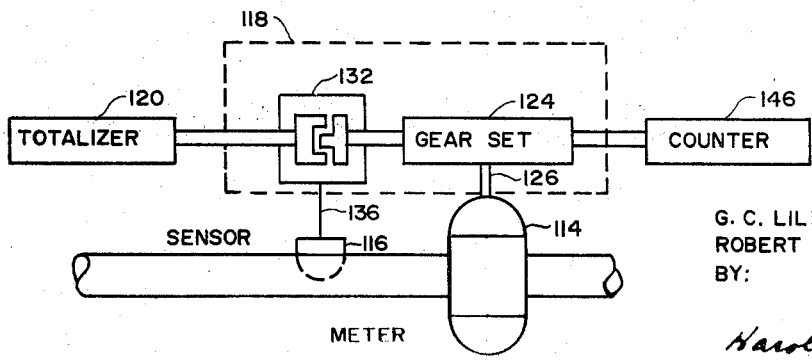
FIG. 6 is a schematic view of yet another embodiment of the invention.

However, for a positive displacement meter, the electric motor 138 may be omitted as shaft 126 can be driven directly by the output shaft of the meter as in FIG. 6. This arrangement then becomes entirely mechanical and requires no electric power and in certain installations is the preferred embodiment for use with positive displacement meters.

We claim as our invention:
1. Apparatus for determining the volumetric average of a parameter of a fluid passing through a conduit comprising
   a conduit;
   means operatively arranged to the conduit for measuring the volume of a fluid flowing therethrough, the measuring means including means producing a first signal upon passage of a predetermined volume through the measuring means;
   a sensor operatively arranged to the conduit for sensing the value of the parameter;
   means operatively connected to the first signal producing means and to the sensor for producing a second signal having a duration indicative of the value of the sensed parameter upon occurrence of the first signal;
   means operatively connected to the second signal producing means for summing the second signal; and
   means for counting the number of summations.
2. The apparatus of claim 1 wherein the counting means is operatively connected to the first signal producing means.
3. The apparatus of claim 1 wherein the counting means is operatively connected to the second signal producing means.
4. The apparatus of claim 1 wherein the second signal producing means comprises transmitter means for producing pulses of varying duration and means responsive to the sensed parameter for varying the duration of the pulse and wherein the summing means comprises timer means for adding the pulse durations.
5. The apparatus of claim 4 and, in addition, means operatively connected to the transmitter means for converting said varying duration pulses to a digital quantity, said summing means adding said digital quantities.
6. The apparatus of claim 1 wherein the second signal producing means comprises means providing a shaft rotation and means responsive to the sensed parameter for varying the extent of shaft rotation and wherein the summing means comprises means for adding the shaft rotations.
7. The apparatus of claim 6 wherein the means for varying the extent of shaft rotation comprises clutch means.
8. A method for obtaining the volumetric average of the temperature of a fluid through a conduit during a metering period comprising the steps of
   measuring the volume of fluid passing through the conduit;
   producing a first signal upon passage of a predetermined volume through the conduit;
   sensing the value of the temperature;
   producing a second signal having a characteristic indicative of the value of the sensed temperature;
   summing the characteristic during the metering period only upon occurrence of the first signal to obtain a value proportional to the product of the temperature and total volume passed through the conduit during the metering period;
   counting the number of summations; and
   dividing the summed value by the number of summations to obtain the volumetric average of the temperature.
9. The method of claim 8 wherein the fluid is a liquid, and the predetermined volume is in excess of one barrel.

* * * * *